Patented Nov. 9, 1937

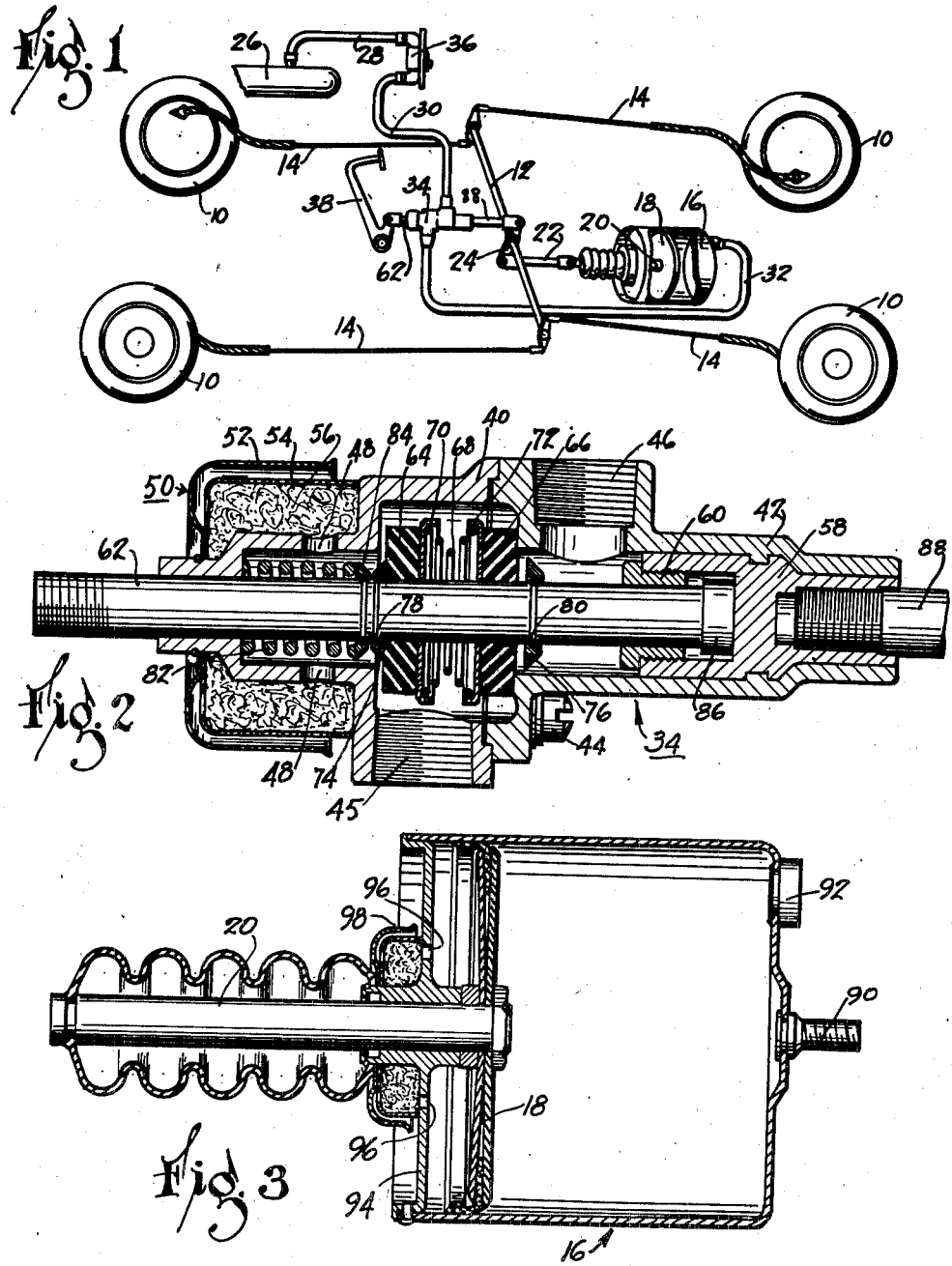
Nov. 9, 1937. V. W. KLIESRATH 2,098,665
BRAKE
Filed April 24, 1936
INVENTOR.
VICTOR W. KLIESRATH
BY Jerome R. Cox
ATTORNEY.

2,098,665

UNITED STATES PATENT OFFICE 2,098,665

BRAKE

Victor W. Kliesrath, South Bend, Ind., assignor to Bendix Products Corporation, South Bend, Ind., a corporation of Indiana Application April 24, 1936, Serial No. 76,119

1 Claim. (Cl. 188—152)

This invention relates to power operated brakes and is disclosed as a vacuum power operated brake for an automobile. For operating the brake disclosed power is supplied by utilization of the suction available in the intake manifold of the automobile.

One of the objects of the invention is the simplification of control arrangement for such a power brake and the provision of a valve which is simple and economical to manufacture and efficient in use.

A further object of the invention is the arrangement of the various parts including the valve and power cylinder so that the power efficiently operates the brakes and so that in the event of failure of the power the brakes may be applied manually.

Further objects of the invention will be apparent after a reading of the subjoined specification and claim and after a consideration of the accompanying drawing in which:

Figure 1 is a fragmentary diagrammatic view illustrating the arrangement of the various parts of a power brake system constructed according to my invention;

Figure 2 is a view in section on an enlarged scale of the valve shown in Figure 1; and Figure 3 is a view in section on an enlarged scale of the power cylinder shown in Figure 1.

It may be seen that I have illustrated in Figure 1 an automobile provided with wheels 10, a brake operating cross shaft 12 which is connected by tension connections 14 with the brakes for operating the brakes.

The brakes are normally operated by power. A power cylinder 16 is provided with a piston 18 connected by a piston rod 20 and a tension link 22 with a lever 24 secured to the cross shaft 12. The forward face of the piston 18 is exposed to atmospheric pressure. The rearward face of the piston 18 is at times exposed to atmospheric pressure but is also at other times exposed only to subatmospheric pressure developed in the rear end of the cylinder by reason of a connection with the intake manifold 26. Thus the intake manifold is connected with the rear of the cylinder 16 by conduits 28, 30 and 32. Interposed between the conduits 30 and 32 is a valve 34 which controls the connection between the intake manifold and the power cylinder. Also interposed between the conduits 28 and 30 is a pressure control valve 36 by which the maximum suction desirable in the power cylinder 16 is limited and by means of which the suction available for the operation by power is made more nearly uniform.

The valve 34 is controlled by the pedal 38 to connect the rear end of the power cylinder 16 either with the intake manifold 26 or with the atmosphere as may be desired or to maintain the rear end of the cylinder 16 isolated from both the intake manifold or the atmosphere.

My improved valve is shown more clearly in Figure 2 wherein it may be seen that the valve 34 comprises a pair of casings 40 and 42 secured to each other by bolts such as 44. The casing 40 is provided with a threaded port 45 to which is secured the conduit 32 leading to the power cylinder 16 and the casing 42 is provided with a threaded port 46 to which is connected the conduit 30 leading to the intake manifold 26. The casing 40 is also provided with ports 48 which connect the interior of the casing with the atmosphere by way of an air cleaner 50 including a pair of sleeves 52 and 54 and absorbent material 56. The rear end of the casing 42 is sealed by a plug 58 in which there is threaded a second plug 60 for purposes later to be described.

Extending through both of the casings 40 and 42 is a movable valve element including a valve stem 62 which as shown in Figure 1 is connected to the pedal 38. Within the valve 34 this stem carries slidably mounted thereon a pair of compressible sealing disks 64 and 66 which are resiliently urged apart by a spring 68. The spring 68 is interposed between a pair of metallic guides 70 and 72 which in turn contact with the sealing members 64 and 66 respectively to urge the sealing members apart. For limiting the movement of the sealing members 64 and 66 and for moving those members as desired there is secured on the stem 62 on opposite sides of the sealing members 64 and 66 a pair of annular rings 74 and 76. These rings are secured by spring clips 78 and 80 slipped into grooves in the stem 62. Thus the ring 74 normally urges the member 64 away from its seat on the casing 40 and the ring 76 is adapted at times to urge the sealing member 66 away from its seat on the casing 42. The rings 74 and 76 are spaced apart so that a slight movement of the stem 62 to the left as seen in Figure 2 will allow both the sealing member 64 and the sealing member 66 to seat to close the valve against passage of air therethrough in either direction. A spring 82 interposed between the end of the casing 40 and a ring 84 mounted on the stem 62 similarly to the rings 74 and 76 normally urges the stem toward the right as shown in Figure 2 so as to unseat the sealing member 64 and to allow the sealing member 66 to rest upon its seat. In this position air may flow freely between the rearward end of the cylinder 16 through the conduit 32 into the port 46 and through the ports 48 to the atmosphere or may return along a similar path from the atmosphere, thus maintaining the rear end of the power cylinder 16 at atmospheric pressure. The rearward end of the stem 62 is formed with an enlarged portion 86, which in case of failure of the power cylinder to operate the brakes, is adapted to contact with the plug 60. A tension link 88 is connected to the lever 24, and thus the stem 62 through the contact with the plug 60 and through the plug 58 and the link 88 is adapted to operate the cross shaft 12 to apply the brakes manually.

The power cylinder 16 is shown more in detail in Figure 3 as is also its piston 18. As shown the cylinder is provided with an extension 90 by which it is connected to the chassis of the automobile and with an opening 92 to which the conduit 32 is connected. The forward end of the cylinder 94 is provided with openings 96 which are connected through an air cleaner 98 with the atmosphere.

In the operation of brakes according to this invention, pressure by the operator upon the foot pedal 38 moves my improved valve member to connect the rear of the power cylinder with the intake manifold 26, thus withdrawing air from the rear end of the power cylinder and pressure of the atmosphere acting on the forward face of the piston moves the piston rearwardly, thus exerting tension on the rod 20 and through the link 22 and the lever 24 rotating the cross shaft 12 to apply the brakes. As the brakes are applied, and the shaft 12 rotated, link 88 moves the casing of the valve 34, thus lapping the valve so that the rear end of the power cylinder is cut off from the intake manifold suction as well as from the atmosphere. Further movement of the pedal 38 is effective to again open communication between the intake manifold and the rear end of the cylinder and apply greater pressure to the brakes. Upon the release of the pedal the connection between the intake manifold and the cylinder is cut off and a connection is made between the atmosphere and the power cylinder, thus allowing air to flow into the power cylinder and cause the return movement of the piston and the release of the brakes.

The operation of my improved valve is as follows: Tension exerted upon the stem 62 moves the ring 74 forward to allow the sealing member 64 to seat, thus cutting off the atmosphere from the opening 45. In this position the rear end of the cylinder 16 is cut off both from the atmosphere and from the vacuum. Continued tension exerted upon the stem 62 continues to compress the spring 82 and causes the ring 76 to contact with the sealing member 66, thus moving the sealing member from its seat and connecting the opening 46 with the opening 45, thus connecting the intake manifold with the rear end of the cylinder. As the cross shaft 12 is rotated the link 88 is moved to move the casing so that the sealing members 64 and 66 are again spread apart by the spring 68 and the member 66 comes again into contact with its seat. When the sealing member 64 contacts with its seat the rear end of the cylinder 16 is again cut off from both atmosphere and vacuum and the brakes are held in the position at which they are. In the event that greater braking is desired this operation must be continued by additional pressure on the pedal 48 and the resultant continued tension on the stem 62. Upon release of pressure upon the pedal the spring 82 moves the movable valve elements to the position shown in Figure 2, thus allowing atmospheric pressure to fill the rear end of the cylinder 16 and release the brake to the extent allowed by the return of the pedal.

It is to be understood that the above-described embodiments of my invention are for the purpose of illustration only and various changes may be made therein without departing from the spirit and scope of the invention.

I claim:

A vacuum power brake system comprising brakes, a power cylinder, connections between the power cylinder and the brakes, means for connecting one end of the power cylinder constantly with the atmosphere, a source of suction, means for at will controlling fluid connection to the other end to the power cylinder to connect said end either to the source of suction or to the atmospheric as desired, said means for controlling the connection to the power cylinder comprising a valve, and said valve comprising a casing formed with a forward end and a rearward end, formed with an opening adjacent to the forward end connected with the atmosphere, formed with an opening adjacent to the rearward end connected with said source of suction, formed with a pair of valve seats interposed between said openings, formed with an opening intermediate said seats arranged to be connected with said power cylinder, and formed at its forward end with a central bore, and provided with a pair of substantially uniform size valve elements also interposed, a stem extending into said casing through said central bore and provided with an enlargement at its rearward end and with three annular rings, two of which are arranged at times to contact with said valve elements to move said valve elements from sealing engagement with their associated seats, and connected outside of said casing with a member for operating said stem whereby one or the other said valve elements may be moved from its associated seat or both of said elements may be allowed to rest upon their associated seats, a spring interposed between said valve elements and urging both of them toward their respective seats, a spring interposed between the forward end of said casing and said third ring, an air cleaner associated with said atmospheric opening, and a pair of plugs secured within the rearward end of said casing against which the enlargement of the stem is at times arranged to bear so as to move the casing in either direction as desired.

VICTOR W. KLIESRATH.